No. 794,076. PATENTED JULY 4, 1905.
T. F. & M. J. BRENNAN.
BRAKE.
APPLICATION FILED OCT. 7, 1904.
2 SHEETS—SHEET 1.
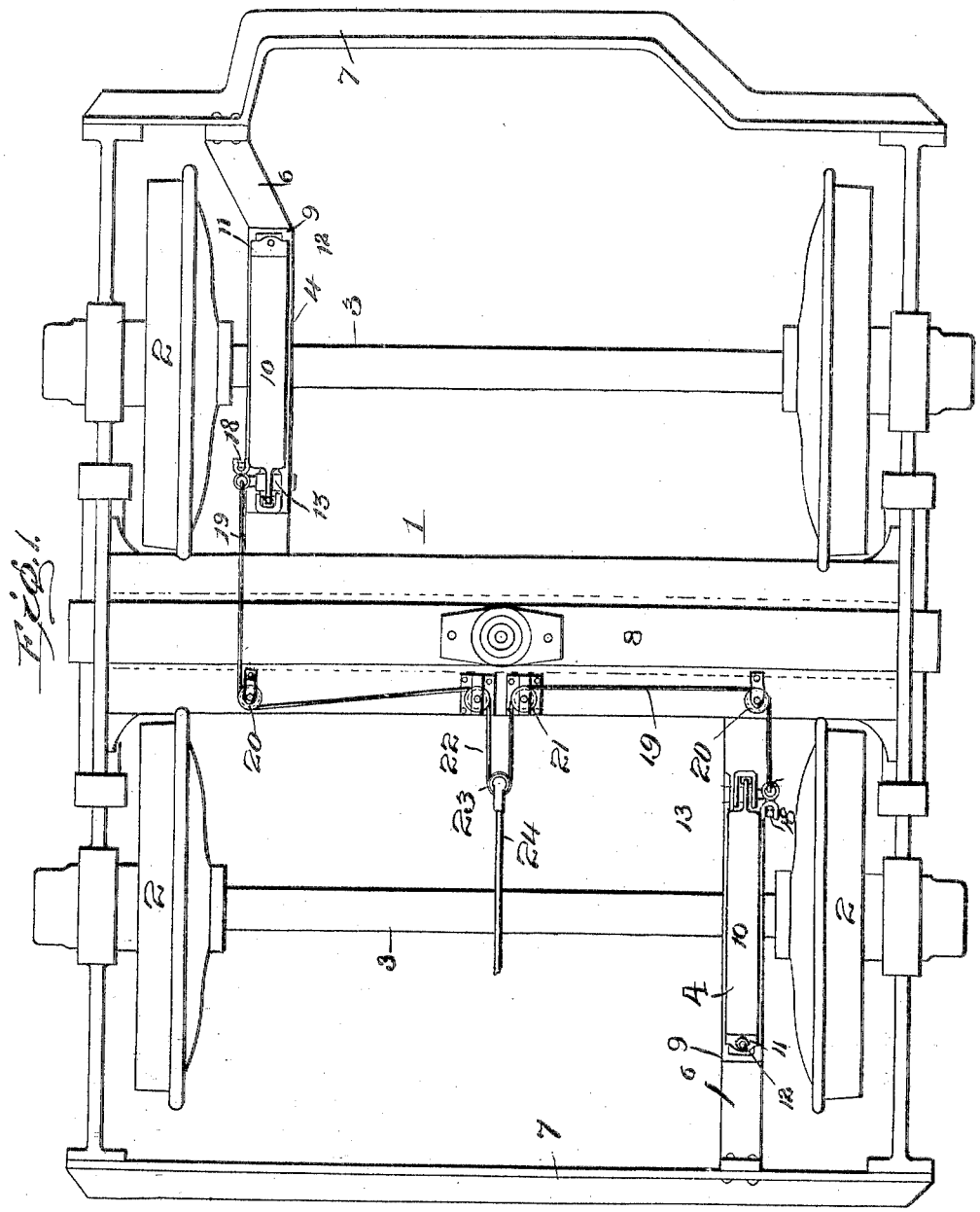

No. 794,076. PATENTED JULY 4, 1905.
T. F. & M. J. BRENNAN.
BRAKE.
APPLICATION FILED OCT. 7, 1904.
2 SHEETS—SHEET 2.
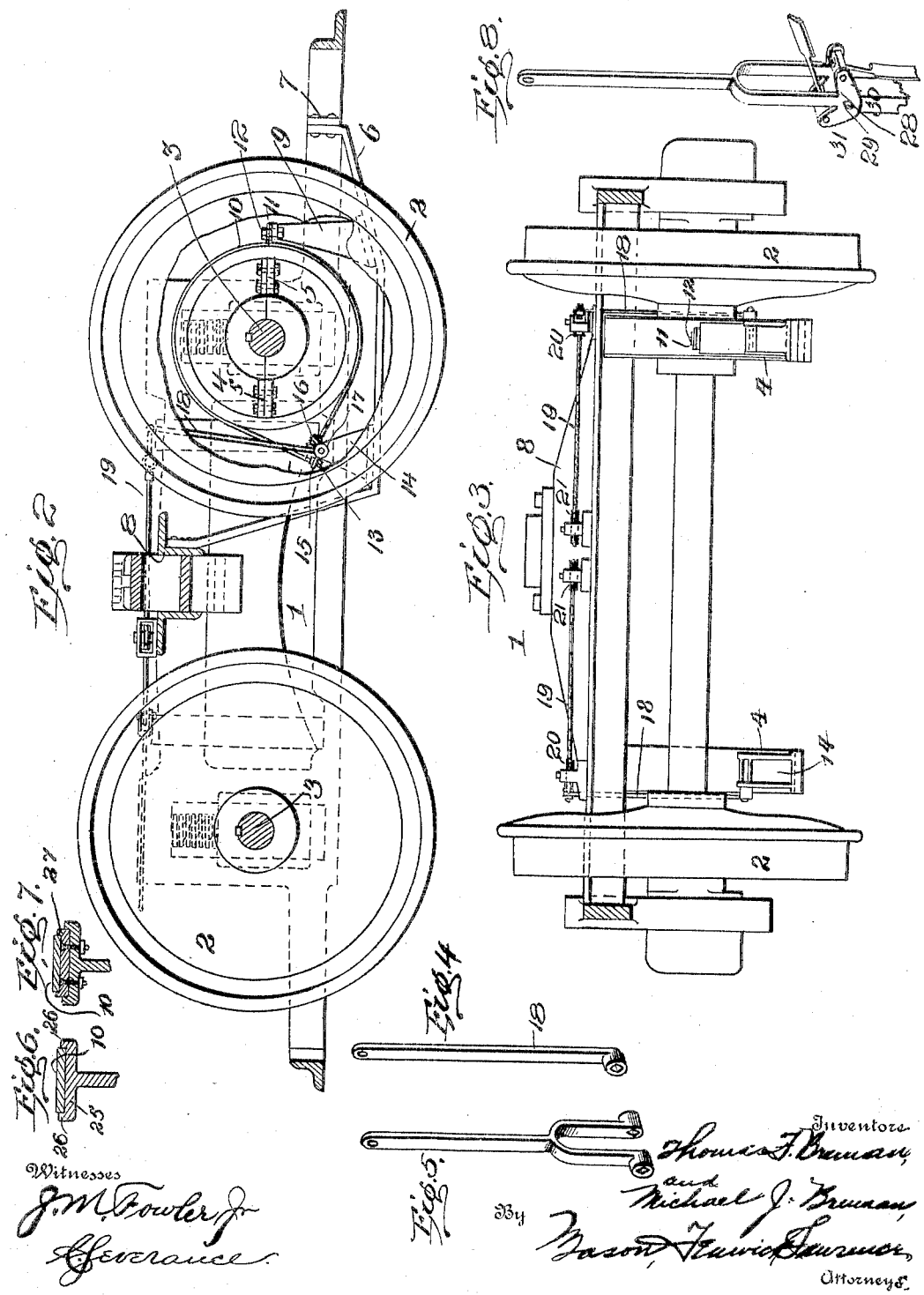

No. 794,076.                                                          Patented July 4, 1905.

UNITED STATES PATENT OFFICE.

THOMAS F. BRENNAN AND MICHAEL J. BRENNAN, OF SCRANTON, PENNSYLVANIA, ASSIGNORS OF ONE-THIRD TO THOMAS J. MULLEN, OF SCRANTON, PENNSYLVANIA.

BRAKE.

SPECIFICATION forming part of Letters Patent No. 794,076, dated July 4, 1905.

Application filed October 7, 1904. Serial No. 227,565.

*To all whom it may concern:*

Be it known that we, THOMAS F. BRENNAN and MICHAEL J. BRENNAN, citizens of the United States, residing at Scranton, in the county of Lackawanna and State of Pennsylvania, have invented certain new and useful Improvements in Brakes; and we do hereby declare the following to be a full, clear, and exact description of the invention, such as will enable others skilled in the art to which it appertains to make and use the same.

This invention relates to improvements in braking apparatus for vehicles, and is particularly adaptable to cars of various sorts; and the object is to simplify this kind of apparatus and yet obtain a quick and powerfully acting brake which will be capable of holding the car or other vehicle and stopping the same at any time.

The invention consists in a braking mechanism for vehicles, comprising a brake-wheel, a braking-band engaging the same, means for supporting the braking-band upon the frame of the vehicle or the truck thereof, and means for tightening the band about the brake-wheel.

It also consists in certain other novel constructions, combinations, and arrangements of parts, as will be hereinafter fully described and claimed.

In the accompanying drawings, Figure 1 is a top plan view of a car-truck provided with a braking mechanism made in accordance with the present invention. Fig. 2 is a side elevation of a car-truck, one of the wheels being broken away to illustrate the braking mechanism which is applied to the axle thereof. Fig. 3 is an end elevation of the said truck. Figs. 4 and 5 are detail views showing the brake-applying lever made in different forms. Figs. 6 and 7 are detail sectional views showing portions of the brake-wheel. Fig. 8 is a detail perspective view of a modified form of brake-lever, The braking system forming the subject-matter of the present invention is applicable to vehicles of various types, but is especially useful in connection with cars either for electric, steam, or other railways. In the accompanying drawings we have illustrated the braking system applied to the truck of a car, in which—

1 indicates a car-frame, and 2 wheels for the same. Applied to the axle 3 of each set of wheels is a brake-wheel 4. The brake-wheel 4 may be secured to the axle in any desired manner; but we usually form the said wheel in two parts and provide the same with meeting flanges, as at 5, through which bolts may be passed to draw the parts together and tightly clamp them upon the axle of the wheels. The said brake-wheel may be keyed or otherwise secured to the axle in addition to the clamping of the same, so that the brake-wheel cannot slip with respect to the axle. A brake-band-holding bar or frame 6 is secured to the truck-frame, being connected at one end to one of the cross-bars 7 of the frame and at the other end to one of the bars or beams of the truck-bolster 8.

Rising from the bar 6 is a supporting-standard 9, to the upper end of which is secured a band-brake 10. The band-brake may be made in a single piece and provided with a lateral lug or projection, which is bolted to the standard 9, or, as shown in the drawings, may be formed of two parts having outwardly-turned ends 11, resting upon the upper end of the standard 9 and perforated to receive one or more securing-bolts 12. In this manner the brake-band is held against movement longitudinally and is supported in proper relation to the brake-wheel 4. Each of the free ends of the brake-band sections, after being passed around the brake-wheel, approaches each other and are connected with a rocking member 13, which is pivotally supported upon a second standard, as 14, rising from the bar 6. The rocking member 13 is formed with radially-projecting arms 15 and 16, to which the ends of the brake-band sections are secured. The said arms or lugs 15 and 16 project from a central hub or body portion 17 preferably at an obtuse angle with respect to each other. By rocking the rock member 14 in one direction it will be seen that the band-sections can be drawn tightly against the band-wheel, and by rocking it in the other direction the brake-bands can be loosened from the periphery of the band-wheel, so that the said wheel may run freely within the same. The rock member 13 is rigidly connected with the braking-lever 18, which extends upwardly a suitable distance to give ample leverage for applying the brake. The upper end of the lever is connected with a cable 19 or other flexible connection, the cable passing about guide-pulleys 20 and 21, mounted upon the truck-frame. As there are nearly always two sets of wheels in each car-truck, so that two sets of brakes are carried upon the truck, it is preferable to make a continuous cable operate both of the braking-levers, and in this manner also an even pull is exerted upon each brake. The braking-cable 19 is formed with a central looped portion 22, which is engaged by a pulley 23, carried by the end of one of the brake-applying rods 24. The rod 24 is connected in any suitable or usual manner with a brake-applying mechanism—such, for instance, as a hand-crank—or with the plunger of an air-cylinder, so that the brakes can be tightened or loosened in any ordinary and usual way.

As illustrated in Figs. 6 and 7, the brake-wheel may be made in different ways. As shown in Fig. 6, the brake-wheel is provided with a peripheral portion 25, formed with annular edge flanges 26, and in this manner a comparatively wide groove is formed upon the periphery of the brake-wheel for receiving the band 10. As shown in Fig. 7, however, the periphery of the brake-wheel may be made with a wider and deeper groove than is shown in Fig. 6, and wood or composition segments, as 27, may be secured thereto, the said segments being also provided with an annular depression or groove for receiving the band-brake 10.

The lever for operating the rock member 13 may be formed of a straight arm or bar, as shown in Fig. 4, or may be bifurcated or forked at its lower end, as shown in Fig. 5. In using the single form of lever shown in Fig. 4, the lower end thereof is secured to a squared or many-sided end formed upon the body portion of the rock member, and in using the form of lever shown in Fig. 5 both of the lower ends of said lever are secured in a similar manner to squared portions upon each end of the rock member 13. As shown in Fig. 8, the brake-lever when bifurcated at its lower end may be provided with enlarged heads 28, which are formed with bearings 29 for engaging trunnions provided upon the standard 14. The said heads have mounted between them rocking bars 30 and 31. The rocking bars are provided with central apertures, so that the ends of the brake-bands may be bolted or otherwise secured thereto, and the rocking of the lever will thus accomplish the tightening of the brake-band upon the brake-wheel. The different forms of brake-levers described are entirely within the spirit of the invention, since they all operate to draw the ends of the brake-band past each other when the lever is moved for tightening the brake-bands upon the brake-wheels.

It will be seen that band-wheels of considerable size may be applied to the axles and that the bands, with the rocking levers, will be capable of exerting great braking power upon the said wheels. It will be observed that in a brake of this character very few parts are needed and that the connection of the brake-levers with the remainder of the braking system, whatever it may be, is exceedingly simple and easily effected. The use of a brake of this kind also prevents unnecessary wear upon the periphery of the vehicle-wheels, since the braking system does not engage the said wheels in any way. The braking mechanism can be readily applied to any vehicle in common use and to the trucks of street or railway cars with only the addition of a supporting-bar for holding the brake-band and the rocking member, together with its lever.

Although we have illustrated the bar for holding the band-brake in position as arranged below the car-axle, it will be evident that it may be arranged above the car-axle, the supporting-standards for the band-brake and the operating-lever projecting downwardly, without departing from the spirit of the invention. It is preferable, however, to have the bar arranged below the car-axle, as illustrated in Figs. 2 and 3 of the drawings.

As above intimated, the band-wheels may be made in halves or in a whole piece, as desired, and instead of applying them to the axle, as shown in the drawings, it will be evident that they may be bolted directly to one of the wheels, all within the spirit of the invention. The brake mechanism also can be applied to cars having single trucks as well as to cars provided with multiple trucks arranged near the ends thereof. The braking apparatus can be operated by cables or flexible rods, as found most desirable, all within the spirt of the present invention.

Having thus fully described our invention, what we claim as new, and desire to secure by Letters Patent, is—

1. A brake mechanism for vehicles, comprising a brake-suspension member carried by the vehicle-truck, a support mounted upon the said suspension member, a truck-wheel secured to the axle of the vehicle, a sectional flexible band for engaging the brake-wheel and secured to the said supporting means, and means for drawing the movable ends of the band together to grip the brake-wheel.

2. A braking mechanism for vehicles, comprising a brake-wheel secured to the axle of the vehicle, a suspension-bar secured to the truck of the vehicle, a support projecting upwardly from said suspension member, a band-brake made up of flexible band-sections rigidly secured at their ends to the supporting member, a rock member also mounted upon said suspension member and connected with the movable ends of the band-brake, and means for rocking said member to draw the bands tightly upon the brake-wheel.

3. A car-brake, comprising a suspension-bar arranged longitudinally of a car-truck, a standard carried thereby, a divided band rigidly secured to said standard, a brake-wheel secured to the car-axle, the divided band extending around said brake-wheel, and means for tightening the movable ends of the said divided band about the brake-wheel.

4. A car-brake, comprising a brake-wheel secured to the axle of a car-wheel, a supporting suspension bar or bolster carried by the car-truck, a standard rising from said bar, band-brake sections secured rigidly at one of their ends to said standard while their movable ends extend around the brake-wheel, a second standard rising from the suspension-bar, and a rocking member mounted adjacent to the movable ends of the band-sections, and connected therewith for drawing the band-sections tightly against the brake-wheel.

5. A braking mechanism for vehicles comprising a brake-wheel secured to the axle of the vehicle, a supporting-bar mounted upon the frame of the said vehicle, standards rising from said bar upon each side of the brake-wheel, band-sections secured to one of said standards, a rocking member mounted upon the other standard, the ends of the band-sections being connected with the said rocking member and a lever for rocking the said member and tightening the bands upon the brake-wheel.

6. A brake mechanism for vehicles comprising brake-wheels secured to the axles of the vehicle, brake-bands engaging the said wheels, levers for tightening the brake-bands, a flexible cable connecting the said levers and a draw-rod movably engaging the said cable for exerting an even pull upon both of said levers.

7. A brake mechanism for car-trucks comprising brake-wheels secured to the axles of the truck, bands engaging the said brake-wheels, levers for tightening the bands, a cable connecting the ends of the levers, guide-pulleys for directing the movement of the cables, and a draw-rod movably engaging the central portion of the cable for applying the brakes simultaneously with equal pressure.

8. A brake mechanism for cars comprising a hanger or supporting-bar secured to the car-truck, standards rising from the said hanger, a band-brake secured at its central portion to one of said standards, a tightening member engaging the ends of the said band and a brake-wheel arranged within the band and secured rigidly to the axle of the car-truck.

9. A brake mechanism, comprising a brake-wheel, a flexible band surrounding the same, and provided with a lateral projection intermediate its length, means rigidly securing said lateral projection and means for drawing the ends of the band together around the band-wheel.

10. A brake mechanism, comprising a brake-wheel, a flexible band inclosing the same formed in sections, the sections having their adjacent ends turned outwardly and applied together, means for rigidly holding the said outwardly-turned ends, and means for drawing the movable ends of the band together for applying the brake.

In testimony whereof we affix our signatures in presence of two witnesses.

THOMAS F. BRENNAN.
MICHAEL J. BRENNAN.

Witnesses:
W. W. BAYLOR,
HENRY R. GOUGH.